United States Patent [19]

Kothmayer

[11] Patent Number: 5,057,060
[45] Date of Patent: Oct. 15, 1991

[54] DRIVE PULLEY FOR CABLEWAYS

[76] Inventor: Herbert Kothmayer, Phil. Welserstr-5/II/5, Innsbruck, Austria, 6020

[21] Appl. No.: 512,365

[22] Filed: Apr. 23, 1990

[30] Foreign Application Priority Data

Apr. 25, 1989 [AT] Austria .................................. 995/89

[51] Int. Cl.$^5$ ............................................. F16H 55/36
[52] U.S. Cl. ..................................... 474/166; 474/902
[58] Field of Search ............... 474/166, 172, 184, 188, 474/902, 903

[56] References Cited

U.S. PATENT DOCUMENTS

| | | | |
|---|---|---|---|
| 110,247 | 12/1870 | Kitson | 474/166 X |
| 1,694,350 | 12/1928 | Bloss . | |
| 4,413,981 | 11/1983 | White et al. | 474/902 X |

FOREIGN PATENT DOCUMENTS

| | | | |
|---|---|---|---|
| 139049 | 1/1902 | Fed. Rep. of Germany . | |
| 0426266 | 7/1923 | Fed. Rep. of Germany | 474/166 |
| 891283 | 3/1944 | France . | |
| 0002623 | of 1886 | United Kingdom | 474/166 |
| 14967 | of 1912 | United Kingdom . | |

Primary Examiner—Thuy M. Bui
Attorney, Agent, or Firm—Fleit, Jacobson, Cohn, Price, Holman & Stern

[57] ABSTRACT

A drive pulley, in particular, a cable drive pulley for cableways, includes a hub, a rim and a spoke arrangement therebetween. The individual spokes are arranged independently from one another. The spoke design has at least two pairs of spokes, and the distance between connecting points of any pair of spokes is greater at the hub than at the rim. The spokes of a pair of spokes are angularly displaced in relation to imaginary radii emerging from the connecting points on the rim, and between any two pairs of spokes, at least one radial support spoke 7 may be provided.

6 Claims, 2 Drawing Sheets

DRIVE PULLEY FOR CABLEWAYS

BACKGROUND OF THE INVENTION

1. Field of the Invention

This invention relates to a drive pulley for hauling equipment, and in particular, a rope or cable drive pulley for cableways, comprising a hub, a rim and spokes between the hub and ring serving as connecting elements. The individual spokes are arranged independently from one another.

The first known rope pulleys of this kind were built in accordance with a wagon wheel. From a small hub radially arranged spokes, usually eight in number, extended to the rim in such known pulleys. The expression "extending independently from one another" in the context of drive pulleys means, with respect to the spokes, that the individual spokes are not directly interconnected, e.g., by cross-over points and accordingly, that common areas of contact at the hub or the rim can only arise at the connecting point. Sheet metal panels inserted locally between adjoining spokes are not considered direct connections in the above sense. As the required capacities and lifting height requirements increased in the construction of such installations, the spoke connections due to increased tangential loads have become increasingly more expensive. The thicknesses of the spokes themselves had to be increased and accordingly their masses increased as well and economics suffered.

2. Description of the Related Art

U.S. Pat. No. 1,694,350 describes a further development, comprising a rope drive pulley, in which the spokes directly fitted to the hub extend obliquely to the radii of the pulley. The connecting points of the spokes to the rim, and respectively, to the hub, are in each case equidistant.

A further alternative solution was proposed in the form of the so-called solid pulley. In this case the connecting member between the hub and the rim takes the form of a continuous surface, usually reinforced by preferably eight radial struts. The advantages resided of this construction reside in an increase in the transmissible drive capacity combined with increased operational reliability. In order to somewhat mitigate the drawback of the high mass, substantially circular holes have been provided in the region between the struts. In the course of time this type of pulley was modified in a variety of manners. For example by the sheet metal panel was doubled, to provide a construction similar to a sandwich construction. The general principle of the solid pulley was retained, however.

SUMMARY OF THE INVENTION

The primary object of the invention is to provide a drive pulley which, for given stability and operational requirements, has a mass which is reduced as much as possible.

According to the present invention this is attained by a spoke design which comprises at least two pairs of spokes, the distance between the connecting points of any spokes forming a pair being greater at the hub than at the rim.

Advantageous embodiments and further advantages of the invention will be further elucidated in the following description with reference to the drawings.

BRIEF DESCRIPTION OF THE DRAWINGS

For that purpose.

DETAILED DESCRIPTION OF SPECIFIC EMBODIMENTS

Figure 1:
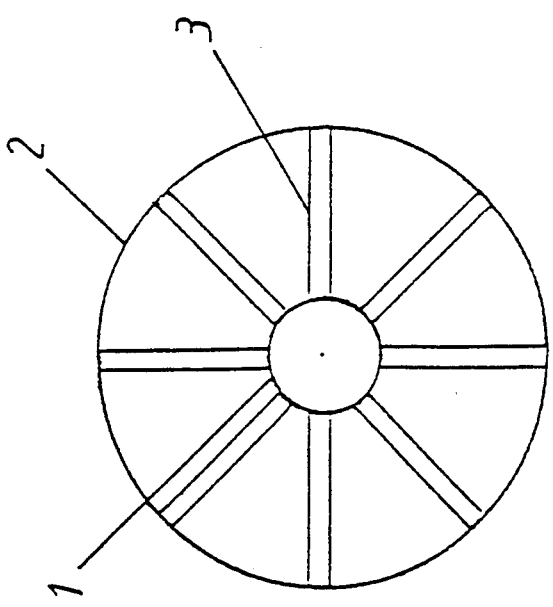
FIG. 1 represents a radial spoke pulley, and FIG. 2 a solid pulley, according to the state of the art.

For a better understanding of the invention, and in order to contrast the invention with the prior art, the latter will first be described with reference to FIGS. 1 and 2. The pulley illustrated in FIG. 1 comprises three elements. The hub 1 forms a connection to the bearing of the transmission. The rim 2 constitutes the contact element for the useful load, and the spokes 3 represent the connecting element between the hub and the rim, serving to stabilize the latter transversely to the pulley plane and conduct to the hub all loads acting on the rim and, where applicable, onto the connecting element. On the other hand, the spokes transmit the drive, and brake moment, to the rim and, in this context are subjected to very high loads and momentum, particularly where they are connected to the hub. Accordingly strong and, therefore, heavy spokes are required.

Figure 2:
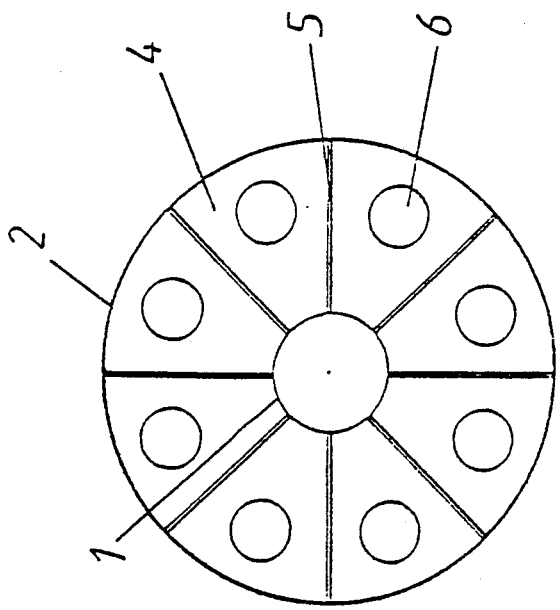

In the case of the solid pulley as shown in FIG. 2, the connecting element between the hub 1 and the rim 2 is formed by a solid sheet metal panel 4. As referred to in the introduction, this may also be designed as a double layer. Usually, struts 5, extending radially from the hub to the rim, are provided in order to strengthen the pulley transversely to its plane. In order to save mass, holes 6 may be cut advantageously in the region between the struts 5.

Figure 3:
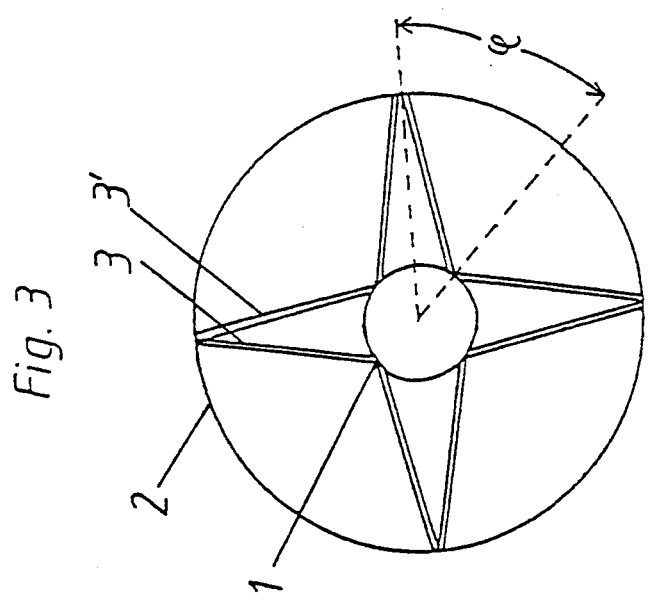
FIG. 3 represents a pulley according to the invention.

Turning now to FIG. 3, the drive pulley according to the invention comprises a spoke arrangement composed of pairs of spokes. The spacing of the connecting points of any pair of spokes 3, 3' is greater at the hub 1 than at the rim 2. For that purpose, at least one spoke in each pair of spokes is angularly displaced in the plane of the pulley in relation to an imaginary radial spoke emerging from the associated connecting point on the rim 2. The drive moment is divided by this construction into a pair of forces of which one component acts in the circumferential direction of the rim 2 and provides drive or brake forces. The radial component of each spoke is absorbed by way of the associated partner spoke 3' and is passed on again to the hub 1. Under tangential load, such that which as arises during driving or braking of a rope, such a system is virtually momentum-free. In this context, a spoke design is particularly advantageous in which the connecting points to the rim 2 of the respective spokes 3, 3' forming a pair of spokes are brought as close together as possible, and preferably until they touch each other.

A further advantageous embodiment provides that both spokes, i.e., spokes 3 and 3', of the pair of spokes, are angularly displaced by different angles about imaginary radii emerging from the associated connecting points on the rim 2, preferably in opposite directions. The embodiment illustrated in FIG. 3 was found to be a particularly advantageous form. It is characterized in that the angle bisector between the spokes 3, 3' in the respective pairs of spokes proceeds exactly radially, and preferably, the individual spokes are angularly displaced in the plane of the pulley in relation to imaginary radial spokes emerging from the same point on the hub by angles between 30° and 80°, preferably about 60°.

The optimal spoke arrangement, mass-wise, results in a compromise between a minimum spoke length on the one hand and a maximum degree of transmission of the force component for driving and braking of the pulley in the longitudinal spoke direction. The first condition was met best by the radial spoke pulley, but would have involved the drawbacks referred to in the introduction of necessary large spoke cross sections. The second requirement, in an extreme case would result in spokes provided exactly tangentially to the hub, however, this would considerably increase the overall length of the spokes and thereby their mass and would furthermore become more complicated from a manufacturing point of view due to the necessary cross-over points between the spokes.

The avoidance of cross-over points leaves sufficient scope for the spokes to avoid excessive cutting powers due to unavoidable loads, e.g., torque in the spokes or bending moments about pivoting axes normal to the plane of the pulley.

The optimal spoke arrangement can be calculated by way of a simple formula which for a given ratio of rim radius $R_K$ and hub radius $R_N$, yields the optimum angle of attack for the spoke (see in this context FIG. 3):

$$\rho_{opt} = a\cos \frac{2}{\frac{R_K}{R_N} + \frac{R_N}{R_K}}.$$

Finally, the mass of the spokes also depends on the material and cross section which must be selected according to the load to be expected.

For rope drive pulleys having diameters between about 2.5 m and 5.0 m and the therefore conventional dimensions for rim and hub radii, the above formula yields an angle 1 of about 58°, corresponding to three pairs of spokes when symmetrically arranged. However, because of the more favorable support for the rim and more simple hub design, it is more advantageous to select a construction with four pairs of spokes, involving only about 4% more mass as compared with the optimal embodiment, yet providing better conditions for connecting the spokes to the hub. The angle for that case is 45° and the angle of the spokes in relation to the radial direction amounts to about 60°.

Figure 4:
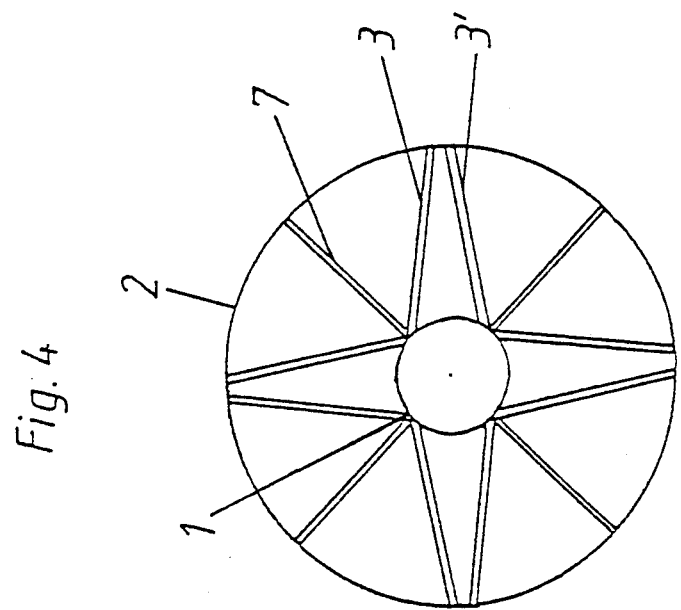
FIG. 4 represents an advantageous modification thereof.

An advantageous further embodiment, as illustrated in FIG. 4, provides, between the pairs of spokes 3, 3' in each case, at least one radial support spoke 7. The latter has no drive function but merely supports the rim against the hub and permits an additional reduction of the rim volume.

The spokes are preferably connected directly, i e. without radial auxiliary spokes, both to the hub 1 as well as to the rim 2.

The cross section for the spokes 3, 3' and 7 must provide adequate bending strength against loads normal to the plane of the pulley, whilst at the same time the cross section must be kept as small as possible.

These conditions are complied with optimally by a certain kind of rolled profiles, so-called I-profiles which can also be connected in a simple manner to the hub and the rim.

The orientation of the profile is so selected that a high bending strength is attained normal to the pulley plane, which is particularly advantageous in the context of horizontally positioned pulleys, or pulleys subject to high transverse loads, whereas within the plane of the pulley a low bending strength is not disadvantageous due to the unavoidable loads referred to further above.

However, in principle any spoke profile can be used, as long as it complies with the aforestated conditions. This includes e.g. profiled tubes of oval or rectangular cross section, the larger diameter of which is substantially normal to the pulley plane, whereas for example circular or square cross sections again amount to an unnecessary volume and therefore mass increase. It is also possible to assemble the spoke cross section from individual cross sections which if provided in a sandwich structure provides similar bending properties as are provided e.g. by I-profiles.

In conclusion it should be mentioned that the mass of the pulleys according to the invention is in the range of about 30–40% of a solid pulley, or 60–70% of a conventional spoke pulley of comparable driving capacity. It was possible to reduce the manufacturing costs as against the aforesaid two cases to about 30 - 40% when particularly considering welding lengths and heat treatment of the pulley. Finally, the advantageous properties with regard to transport should be considered.

The claims which follow are to be considered an integral part of the present disclosure. Reference numbers (directed to the drawings) shown in the claims serve to facilitate the correlation of integers of the claims with illustrated features of the preferred embodiment(s), but are not intended to restrict in any way the language of the claims to what is shown in the drawings, unless the contrary is clearly apparent from the context.

I claim:

1. A cable drive pulley for cableways, comprising:
   a hub having a longitudinally extending central axis,
   an annular rim concentric with said annular rim about said central axis,
   a plurality of spokes interconnecting said hub and said annular rim, each individual spoke of said plurality of spokes extending, independently of the other spokes of said plurality of spokes, from said hub to said rim and having one end thereof connected to said rim and an opposite end thereof connected to said hub,
   the plurality of spokes comprising at least two pairs of spokes, the spokes of each of said pairs of spokes converging towards each other as said spokes of each of said pairs of spokes extend from the hub to the rim.

2. A cable drive pulley according to claim 1, wherein spokes of a pair of said spokes are angularly displaced, by different angles, about imaginary radii emerging from associated connecting points of the spokes and the rim.

3. A cable drive pulley according to claim 2, wherein the spokes of the pair of spokes are angularly displaced in opposite directions.

4. A cable drive pulley according to claim 1, wherein a bisector of an angle formed between a pair of spokes extends radially.

5. A cable drive pulley according to claim 1, wherein, between any two adjacent pairs of spokes, a radial support spoke is provided.

6. A cable drive pulley according to claim 5, wherein each radial support spoke has the same profile as spokes of each pair of spokes.

* * * * *